(No Model.)
A. H. HOY.
GALVANIC BATTERY.
No. 441,843. Patented Dec. 2, 1890.
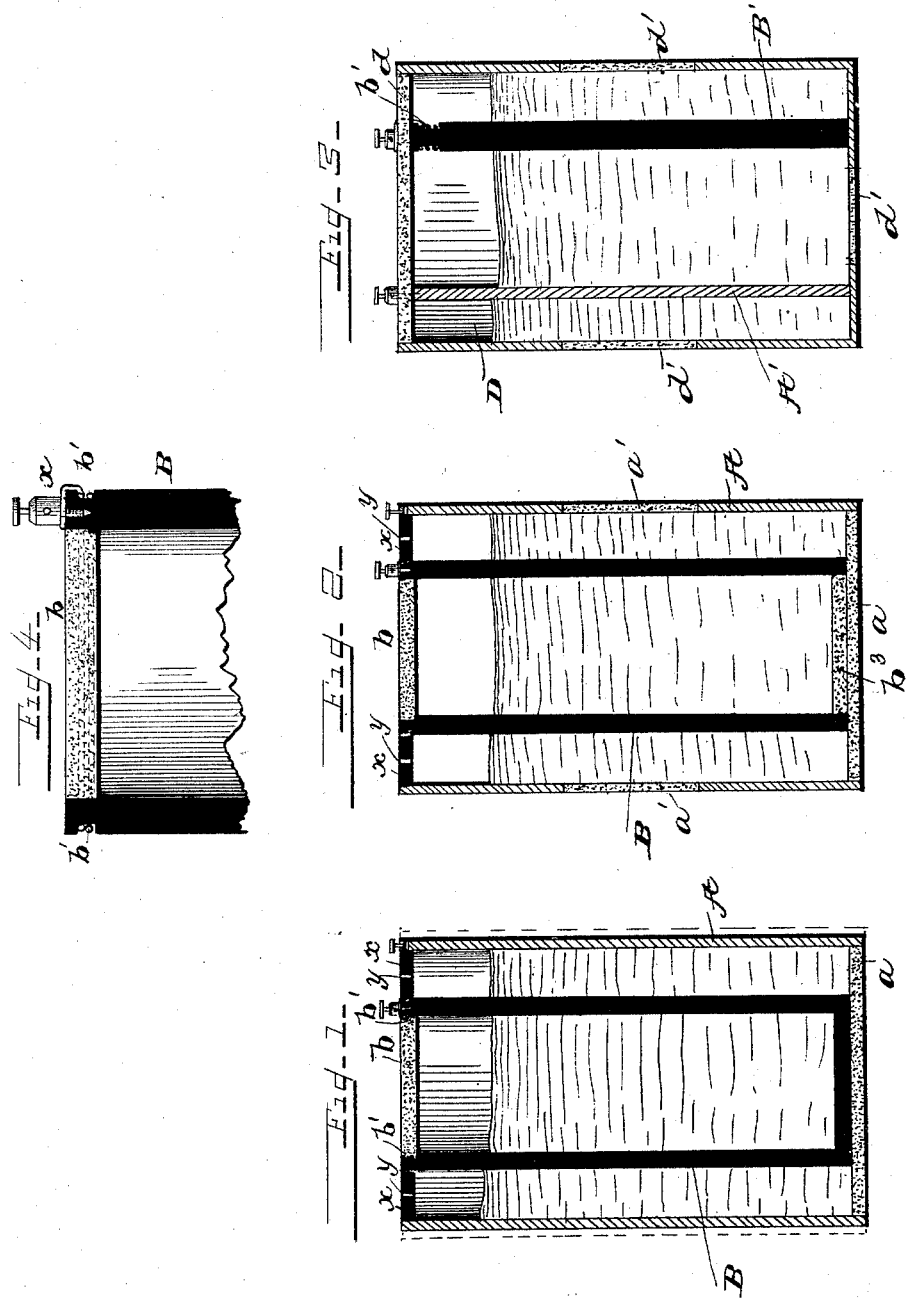
Witnesses
G. A. Tauberschmidt,
L. P. Whitaker.
Inventor
Albert H. Hoy.
By his Attorneys
Whitaker & Prevost.

UNITED STATES PATENT OFFICE.

ALBERT H. HOY, OF RACINE, WISCONSIN.

GALVANIC BATTERY.

SPECIFICATION forming part of Letters Patent No. 441,843, dated December 2, 1890.

Application filed May 26, 1890. Serial No. 353,166. (No model.)

*To all whom it may concern:*

Be it known that I, ALBERT H. HOY, a citizen of the United States, residing at Racine, in the county of Racine and State of Wisconsin, have invented certain new and useful Improvements in Galvanic Batteries; and I do hereby declare the following to be a full, clear, and exact description of the invention, such as will enable others skilled in the art to which it appertains to make and use the same.

My invention is an improvement in galvanic batteries; and it consists in the novel features hereinafter fully set forth.

In the accompanying drawings I have shown one form in which I have contemplated embodying my invention, and the same is fully disclosed in the following specification and claims.

Referring to said drawings, Figure 1 is a sectional view of one form of battery embodying my invention. Fig. 2 is a similar view of a slightly-modified form of battery, and Fig. 3 is a view of another slight modification. Fig. 4 is a detail view showing the manner of attaching the conductor to the carbon element.

I have shown and shall proceed to describe a battery in which the elements are zinc and carbon, respectively; but it will be understood that other elements might be employed without departing from the principle of my invention.

The main object of my invention is to provide means for ventilating batteries by allowing air to enter at the bottom and the gases formed by the chemical action to escape at the top, thus preventing polarization and insuring the continuous action of the battery.

My invention also comprehends other features, which will be hereinafter described.

In the drawings, A represents the negative element of the battery, consisting in this instance of zinc and shown in Figs. 1 and 2 as in the form of a receptacle for the other portions of the battery; but a suitable receptacle may be provided to contain the elements and the exciting medium, as shown in Fig. 3, and in case the zinc cylinder A forms the outer casing of the battery it may be covered with a protecting-covering of papier-maché or other suitable material, or provided with an inclosing-receptacle, as desired.

In the form shown in Fig. 1 the zinc element is in the form of a cylinder; but it may be polygonal or of any other desired shape, and is in this case open at both ends. This cylinder is provided at its lower end with a stopper $a$, fitting within the same, of cork or other porous material, which will permit the ingress of air or the egress of gases without permitting the exciting medium to escape.

Within the cylinder A is a cylinder or other shaped receptacle B of carbon, (shown in this figure as closed at its lower end and open at its upper extremity,) and this cylinder is provided with a stopper $b$, of cork or other porous material, which will permit the escape of gases formed within the said cylinder. The space between the cylinders A and B is filled with a paste or jelly formed, preferably, of ground or powdered slippery-elm bark and water, and the exciting substance is held in solution in this paste, ammonic chloride being used in this instance. The paste or jelly so formed holds the liquid suspended in it and prevents the evaporation of the same, while it is of such consistency as not to penetrate the stopper $a$, and hence the battery may be termed a "dry battery." The carbon cylinder B is filled with carbonate oxide or other salt of magnesium for the purpose of absorbing the gases formed in said receptacle which do not pass through the porous stopper, and this may be mixed, if desired, with black oxide of manganese. These substances are employed to assist in preventing polarization by absorbing the excess of gases not passing off through the porous stopper.

The upper portion of the space between the cylinders A and B is closed by means of any suitable material, as indicated at $x\ x$, to prevent the evaporation of the jelly or paste, and also to prevent the same from getting out of the cell when the same is placed in different positions. I prefer that this space should not be closed air-tight; but suitable openings are left for the egress of gases formed within the said space, as indicated at $y\ y$.

The zinc and carbon elements are provided with electrical connections in any desired manner, such as binding-posts, as shown.

In Fig. 1 I have shown my preferred manner of providing the carbon element with a connection, which consists in forming the same with a peripheral groove $b'$ on the inner or outer surface of the same, as desired, which groove receives a copper or other metallic conductor, as a wire or ribbon.

The porous stoppers herein referred to are formed, preferably, of cork, which is porous enough to allow the diffusion of gas and air through the same freely, but will not permit the escape of the jelly or semi-fluid from the cell. By using these porous stoppers the gases formed within the cell when it is in use will be permitted to escape from the interior of the cell, and when not in use the gas remaining within the cell will escape or diffuse outwardly through the porous diaphragms or stoppers and air will pass gradually in to take its place by osmotic action, thus assisting to prevent polarization. The action of the gases passing out through the porous stoppers and of the air entering the battery, both of which take place by osmotic action, I have termed "ventilation," and this word is used with this meaning and import in the claims.

It will be obvious that the paste employed in any improved battery must be of such consistency or thickness that it will not penetrate into the porous stoppers and clog the pores of the same.

In Fig. 2 I have shown a slight modification, in which the sides of the cylinder A are provided with porous stoppers $a'$, and in this case the bottom of said cylinder may be closed by means of the porous stopper $a$ also, or the latter could be omitted, if found desirable. The cylinder B is also shown as being open at both ends and closed at the bottom by a porous stopper $b^3$. In cases where a carbon cylinder is employed this last-named stopper may not be necessary, as the bottom of the carbon cylinder would of itself be porous.

In Fig. 3 I have shown a slightly-modified form of battery, which gives good results, especially in small cells. In this form I employ solid blocks or sheets of zinc and carbon, or other material forming the elements of the battery, as shown at $A'$ $B'$, respectively, and place the same in any suitable receptacle D. The slippery-elm paste containing the exciting medium is then introduced into the receptacle, and the latter is closed by a porous stopper $d$. The sides or bottom of the receptacle D, or both, are also provided with porous stoppers $d'$ $d'$, as shown. In this form of battery I rely upon the ventilation of the battery to prevent polarization, the air being gradually admitted through the porous stoppers in the bottom and sides of the receptacle and the gases escaping through the porous top.

It is obvious that the devices employed for ventilating my battery could be used in batteries employing different elements and exciting mediums from those herein set forth, and in other ways I do not desire to be limited to the exact details of construction herein set forth, as variations might be made therefrom to suit different styles of batteries and the ideas of manufacturers without departing from the spirit of my invention.

In the practical use of my improved battery it is obvious that the same should be supported in such a manner that the air may have access to its bottom or under side, so as to pass through the porous stopper located therein. This may be provided for by forming feet upon the side portions of the battery adjacent to the bottom, or by placing the battery upon an open-work bracket or support, or in any other preferred manner.

What I claim, and desire to secure by Letters Patent, is—

1. In a dry battery, the combination, with the receptacle, the elements, and an exciting medium, of porous stoppers for said receptacle for securing the ventilation of the battery, substantially as described.

2. In a dry battery, the combination, with the receptacle, the zinc and carbon elements, and a paste of slippery elm containing the exciting medium, of porous stoppers for said receptacle for securing the ventilation of the battery, substantially as described.

3. In a dry battery, the combination, with the receptacle, the elements, and an exciting medium, of a porous stopper for the said receptacle to permit the gradual ingress of air and another porous stopper at the opposite extremity of the receptacle to permit the egress of gases formed therein, substantially as described.

4. In a battery, the combination, with the outer receptacle forming one of the elements of the battery and provided with a porous bottom, of an inner receptacle forming the other element, provided at the top with a porous stopper, the space between said receptacles being filled with a paste or jelly containing the exciting medium and partially closed at the top, substantially as described.

5. A battery consisting of an outer receptacle forming an element of the same, provided with a porous bottom, an inner receptacle forming the other element, having a porous stopper, the space between said receptacles being supplied with a paste or jelly formed from slippery elm and containing the exciting medium, substantially as described.

6. A battery consisting of a zinc receptacle, a carbon receptacle, said receptacles being each provided with a porous stopper, said carbon receptacle containing a salt of magnesium, and the space between said receptacles being filled with a paste formed from slippery elm and holding the exciting medium in solution, substantially as described.

7. A battery comprising among its features a retaining-receptacle, positive and negative elements, and a paste composed mainly of slippery elm holding the exciting medium in solution, substantially as described.

8. A battery comprising among its members a retaining-receptacle, positive and negative elements, a paste composed mainly of slippery elm holding the exciting medium in solution, and a depolarizing substance consisting of a salt of magnesium, substantially as described.

9. In a battery, a carbon element provided with a groove extending entirely around the same, and an electrical conductor lying in said groove, said conductor lying below the surface of the main body of the element, substantially as described.

In testimony whereof I affix my signature in presence of two witnesses.

ALBERT H. HOY.

Witnesses:
LOUIE WRIGHT,
FABIAN HOWE.